United States Patent
Minami et al.

[11] Patent Number: 5,900,884
[45] Date of Patent: May 4, 1999

[54] PARAMETRIC CURVE GENERATING DEVICE GENERATING A BEZIER CURVE FOR FONT CHARACTER UTILIZATION OR AN ARBITRARY PARAMETRIC CURVE

[75] Inventors: Toshiaki Minami; Tatsuhiko Yamazaki, both of Isehara; Hayao Ohzu, Fuchu; Yuji Hara, Atsugi, all of Japan

[73] Assignee: Canon Kabushiki Kaisha, Tokyo, Japan

[21] Appl. No.: 08/657,033

[22] Filed: May 29, 1996

[30] Foreign Application Priority Data

May 31, 1995 [JP] Japan .................................. 7-134192

[51] Int. Cl.[6] .................................................. G06F 17/21
[52] U.S. Cl. ............................................................ 345/442
[58] Field of Search .................................... 345/442, 441, 345/443, 444, 467, 519; 364/748.01, 748.1, 748.11, 745.02; 371/40.13; 395/595

[56] References Cited

U.S. PATENT DOCUMENTS

| | | | |
|---|---|---|---|
| 4,989,210 | 1/1991 | Scheuneman et al. | 371/40.13 |
| 5,023,828 | 6/1991 | Grundmann et al. | 395/595 |
| 5,128,887 | 7/1992 | Smith et al. | 364/745.02 |
| 5,241,654 | 8/1993 | Kai et al. | 345/442 |
| 5,269,000 | 12/1993 | Ohuchi | 345/442 |
| 5,287,441 | 2/1994 | Nakamura | 345/442 |
| 5,309,521 | 5/1994 | Matsukawa | 345/442 |

OTHER PUBLICATIONS

Freedman, Alan. "The Computer Glossary," 7th ed. New York: AMACOM, p. 374, 1995.

*Primary Examiner*—Joseph H. Feild
*Assistant Examiner*—John L. Young
*Attorney, Agent, or Firm*—Fitzpatrick, Cella, Harper & Scinto

[57] ABSTRACT

A parametric curve generating device for developing a Bezier curve is provided. The device is capable of executing a high speed division operation with a limited magnitude of hardware scale. Adders perform calculations that are stored in registers. Convergence discrimination circuits discriminate whether data stored in the registers converge. Subsequent processing varies depending on the discrimination result. A stack memory is used to store data from the registers.

6 Claims, 10 Drawing Sheets

PARAMETRIC CURVE GENERATING DEVICE GENERATING A BEZIER CURVE FOR FONT CHARACTER UTILIZATION OR AN ARBITRARY PARAMETRIC CURVE

BACKGROUND OF THE INVENTION

1. Field of the Invention

The present invention relates to a parametric curve generating device, which generates an outline font character utilized in the office automation equipment such as a computer or a printer, or an arbitrary parametric curve utilized in the field of CAD, designing, etc.

2. Related Background Art

At first, as an example of the curve there will be explained a Bezier curve. A third-order Bezier curve can be represented by the following equation, utilizing the coordinates $P_0$, $P_1$, $P_2$ and $P_3$ of four points:

$$P(t)=P_0(1-t)^3+3P_1t(1-t)^2+3P_2t^2(1-t)+P_3t^3 (0\leq t\leq 1)$$

Figure 1:
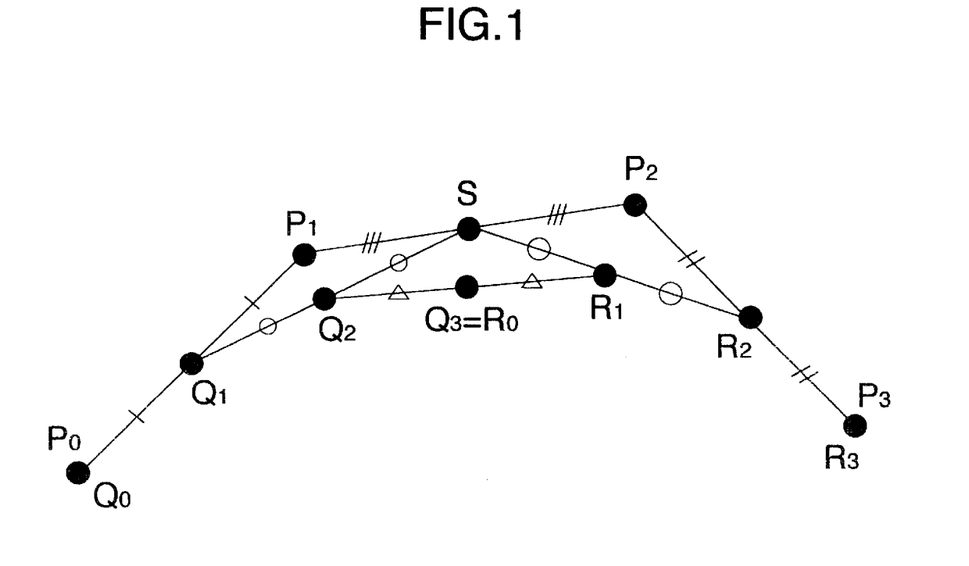
FIG. 1 is a schematic view showing division of a third-order Bezier curve into two.

This Bezier curve ($P_0 \ldots P_3$) can be divided into two Bezier curves ($Q_0 \ldots Q_3$ and $R_0 \ldots R_3$), as shown in FIG. 1, by taking in succession the middle points of the control points ($P_0 \ldots P_3$), wherein $Q_3=R_0$. The drawing is completed by repeating such division, until the entire length of the control points becomes equal to or less than a bit distance 1.

The division of the initial values ($P_0 \ldots P_3$) generates two sets of data, of which one set ($R_0 \ldots R_3$) is saved in a stack and the other ($Q_0 \ldots Q_3$) is used as the initial values of the next division. This operation is repeated, and, if the data ($Q_0 \ldots Q_3$) converge at a certain point, the data ($R_0 \ldots R_3$) is used as the initial values for the next operation. If both data ($Q_0 \ldots Q_3$) and ($R_0 \ldots R_3$) converge, the data of the control points saved immediately before in the stack are revived as the initial values for the next operation. All the operations are completed when the stack becomes empty. Through such process, there can be obtained a train of the developed drawn points of the Bezier curve, in a continuous manner from $P_0$ to $P_3$.

The operation of determining the middle point of two control points involves an addition and a division into ½. Since the ½ division can be achieved by a 1-bit shift to the right, an adder can achieve the addition and the ½ division by shifting the output of the adder to the right by a bit. If the data of the control points are of n bits, the result of the ½ division is given by the upper (n−1) bits of the result of addition. Also the carry-over output of the adder may be used as the uppermost bit of the result of the calculation.

Figure 2:
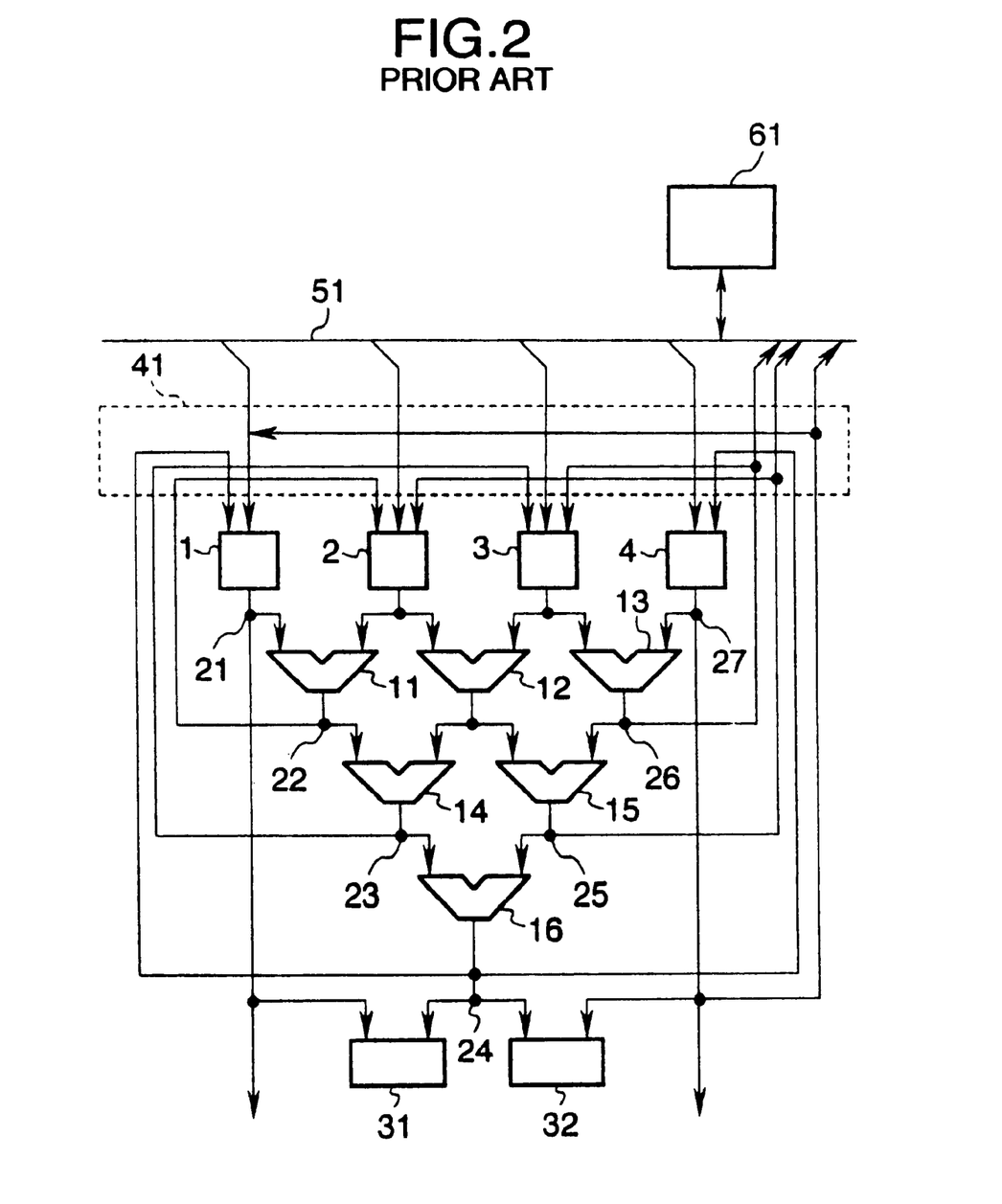
FIG. 2 is a block diagram showing the configuration of a parametric curve generating device.

FIG. 2 shows an example of the circuit of the parametric curve generating device for effecting the above-mentioned ½ division. The above-mentioned data ($P_0 \ldots P_3$) are respectively stored in registers 1–4. Adders 11–16 execute the ½ divisions, and the results of the operation ($Q_0 \ldots Q_3$, $R_0 \ldots R_3$) are released to points 21–27 ($Q_3$ and $R_0$ are same and released to a point 24).

Convergence discrimination circuits 31, 32 respectively determine $|Q_0-Q_3|$ and $|R_0-R_3|$ and discriminate whether these values satisfy a predetermined condition of convergence, namely whether these values are equal to or less than the bit distance 1.

The function of the above-explained parametric curve generating device is classified into three cases according to the state of convergence of the control points, namely a case where ($Q_0 \ldots Q_3$) do not converge, a case where ($Q_0 \ldots Q_3$) converge but ($R_0 \ldots R_3$) do not converge, and a case where ($Q_0 \ldots Q_3$) and ($R_0 \ldots R_3$) both converge. Such function is controlled by an unrepresented control circuit.

In the case when ($Q_0 \ldots Q_3$) do not converge, the data ($Q_1 \ldots Q_3$) released to the points 22, 23, 24 is stored in the registers 2–4 through a selector 41. The content of the register 1, being equal to $Q_0$, remains unchanged. At the same time, the data ($R_1 \ldots R_3$), released to the points 25, 26, 27 is saved in a stack memory 61 through a bus 51, and a similar operation is conducted on the new data ($Q_1 \ldots Q_3$).

In the case when ($Q_0 \ldots Q_3$) converge but ($R_0 \ldots R_3$) do not converge, the data $Q_0$ released from the register 1 to the point 21 is released. For calculating the next points, the data ($R_0 \ldots R_2$) at 24, 25, 26 are stored in the registers 1–3 through the selector 41. The content of the register 4, being equal to $R_3$, remains unchanged.

In the case when ($Q_0 \ldots Q_3$) and ($R_0 \ldots R_3$) both converge, the data $Q_0$ and $R_0$ are released. Then, for calculating a point next to $R_0$, the content ($R_3$) of the register 4 is stored in the register 1 through the selector 41, and the immediately previously saved data of three points are stored in the registers 2–4 from the stack memory 61, through the bus 51 and the selector 41.

For operating this circuit, it is necessary to set a clock cycle in such a manner that the ½ division, discrimination of convergence, switching of the selector 41, transfer to the registers 1–4 and saving/reviving to or from the stack memory 61 can be conducted within a clock cycle. More specifically, disregarding the data transfer time, the above-mentioned setting has to satisfy:

(a clock cycle) >(delay time in an adder) ×3 +(delay time in convergence discrimination circuit) +(selector switching time) +(data set-up time of register)

and the data of three control points has to be simultaneously saved in or revived from the stack memory within this cycle time.

The data of each control point is data with a floating decimal point, consisting of an integral part of $1_0$ bits and a fractional part of $1_1$ bits. In order to generate a Bezier curve without error, the number $1_1$ of bits of the fractional part has to be generally comparable with $1_0$. For example, if $1_0$ has 16 bits, each of the registers 1–4 and the adders 11–16 of the above-explained parameter curve generating device has to have about 32 bits, so that the magnitude of the hardware can become large.

Also the stack memory 61, for simultaneously handling the data of three control points, requires a port of 32×3=96 bits. Similarly, the data bus 51 is required to have a width of 96 bits. The presence of a bus of such large width requires a large wiring area and is disadvantageous in forming this circuit into an LSI.

As explained in the foregoing, in order to execute the ½ division required for determining the Bezier curve at a high speed, the conventional circuit requires a large magnitude and the bus of a large width, and is therefore inadequate for LSI formation.

SUMMARY OF THE INVENTION

The object of the present invention is to provide a parametric curve generating device for generating a Bezier curve, capable of executing the ½ division at a high speed with a circuit of limited magnitude.

The above-mentioned object can be attained, according to the present invention, by a parametric curve generating device for generating an arbitrary parametric curve, having a first register for storing the coordinates of the control point of the curve; a ½ division circuit for dividing the control points, stored in the register, into two thereby forming control points of two curves; and a second register for storing the control points of the two curves formed by the ½ division circuit. The device also includes a stack memory for successively storing the control points of plural sets; a third register positioned between the first and second registers and the stack memory. The third register is and adapted to store the control points of a set. The device further includes a discrimination circuit for determining whether or not to effect the division of the control points by the ½ division circuit. A desired parametric curve is generated and released by repeating the ½ division on the control points given in advance to the first register.

The present invention is further featured by a fact that, in case one of the two sets of the control points formed by the ½ division circuit is temporarily saved according to the result of discrimination by the discrimination circuit, the set to be saved is stored in the third register and then stored in the stack memory.

The present invention is further featured by a fact that, in case the control points of a temporarily saved set of the curve are transferred to the first register according to the result of discrimination by the discrimination circuit, the content of the third register is transferred.

The present invention is further featured by a fact that the dividing operation of the ½ division circuit and the transfer between the third register and the stack memory are simultaneously executed in a parallel manner.

The present invention is further featured by a fact that the stack memory is so constructed as to read and write a control point at a time.

The present invention is further featured by a fact that the ½ division circuit is composed of three adders and the dividing operation of each control point is completed in three clock cycles.

The present invention is further featured by a fact that each of the registers and the stack memory is composed of an integral part and a fractional part.

The present invention is further featured by a fact that the generated curve is a Bezier curve.

The present invention is further featured by a fact that the above-mentioned Bezier curve belongs to a two-dimensional space having x and y coordinates, and the above-mentioned registers and stack memory are provided for each of the x and y coordinates.

The present invention is further featured by a fact that there is provided output means for releasing the generated curve.

The present invention is further featured by a fact that the above-mentioned output means is a printer.

The parametric curve generating device of the present invention generates a desired parameter curve, by repeating a ½ dividing operation on the points of a Bezier curve given to the first register and saving the data from the adders to the stack memory or reviving the data from the stack memory to the adders.

The parametric curve generating device of the present invention is capable of simultaneously executing the dividing operation of the control points of the Bezier curve by the ½ division circuit and the saving/reviving operation of a set of the control points to or from the stack memory in parallel manner, through the use of the third register. Owing to this configuration, each ½ dividing operation can be conducted within 4 clock cycles in all cases, regardless of the state of convergence.

DESCRIPTION OF THE PREFERRED EMBODIMENTS

Figure 3:
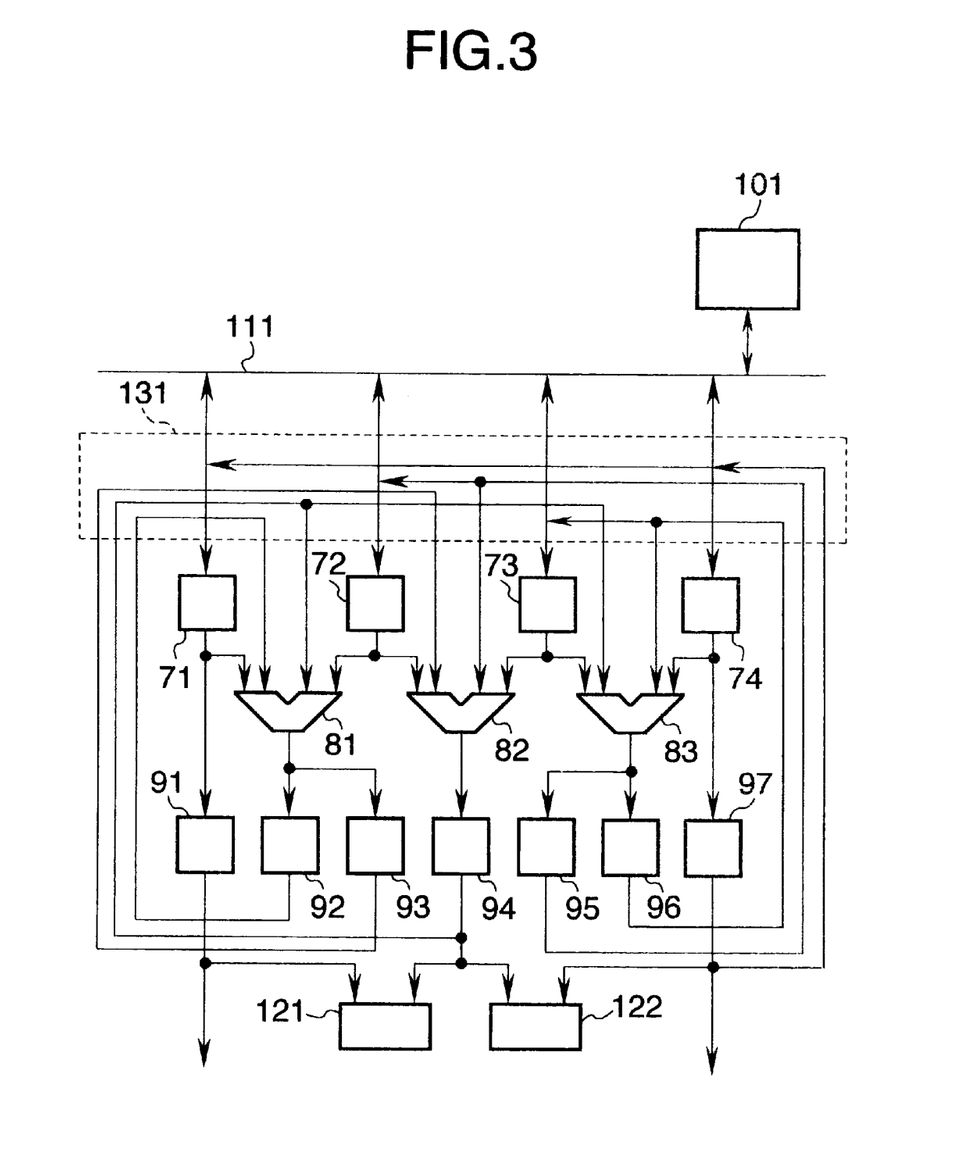
FIG. 3 is a block diagram showing the configuration of a parametric curve generating device.

FIG. 3 shows an example of the circuit embodying the present invention, wherein shown are registers 71–74 for storing the data ($P_0 \ldots P_3$) as in the registers 1–4 explained in the foregoing; adders 81–83 which are reduced in number from six to three in comparison with the configuration shown in FIG. 2; registers 91–97 which are increased in number in comparison with the configuration in FIG. 2; a stack memory 101; and a bus 111 connecting the stack memory 101 with the registers 72–74. This circuit is controlled by an unrepresented control circuit.

The function of this circuit will now be explained with reference to timing charts shown in FIGS. 4, 5 and The operations to the fourth cycle are same in FIGS. 4, 5 and 6.

In a first cycle, the adders 81–83 execute calculations $Q_1=(P_0+P_1)/2$, $S=(P_1+P_2)/2$ and $R_2=(P_2+P_3)/2$, of which results $Q_1$, $S$, $R_2$ are respectively stored in the registers 92, 94, 96. At the same time, $P_0$ is transferred as $Q_0$ to the register 91, and $P_3$ is transferred as $R_3$ to the register 97.

In a second cycle, the adder 81 adds the content of the register 92 and that of the register 94 and multiples by ½, and the obtained result is stored as $Q_2$ in the register 93. Also the adder 83 adds the contents of the registers 94 and 96 and multiplies by ½, and the obtained result is stored as $R_1$ in the register 95.

In a third cycle, the adder 82 adds the contents of the register 93 and 95 and multiples by ½, and the obtained result is stored as $Q_3(R_0)$ in the register 94. At this point, $Q_0$ is stored in the register 91, $Q_1$ in 92, $Q_2$ in 93, $Q_3=R_0$ in 94, $R_1$ in 95, $R_2$ in 96, and $R_3$ in 97. In this manner the ½ division as in FIG. 2 can be executed within three clock cycles.

In a fourth cycle, the convergence discrimination circuits 121, 122 discriminate whether ($Q_0 \ldots Q_3$) and ($R_0 \ldots R_3$) are in the converged state, and the process varies according to the result of the discrimination.

Figure 4:
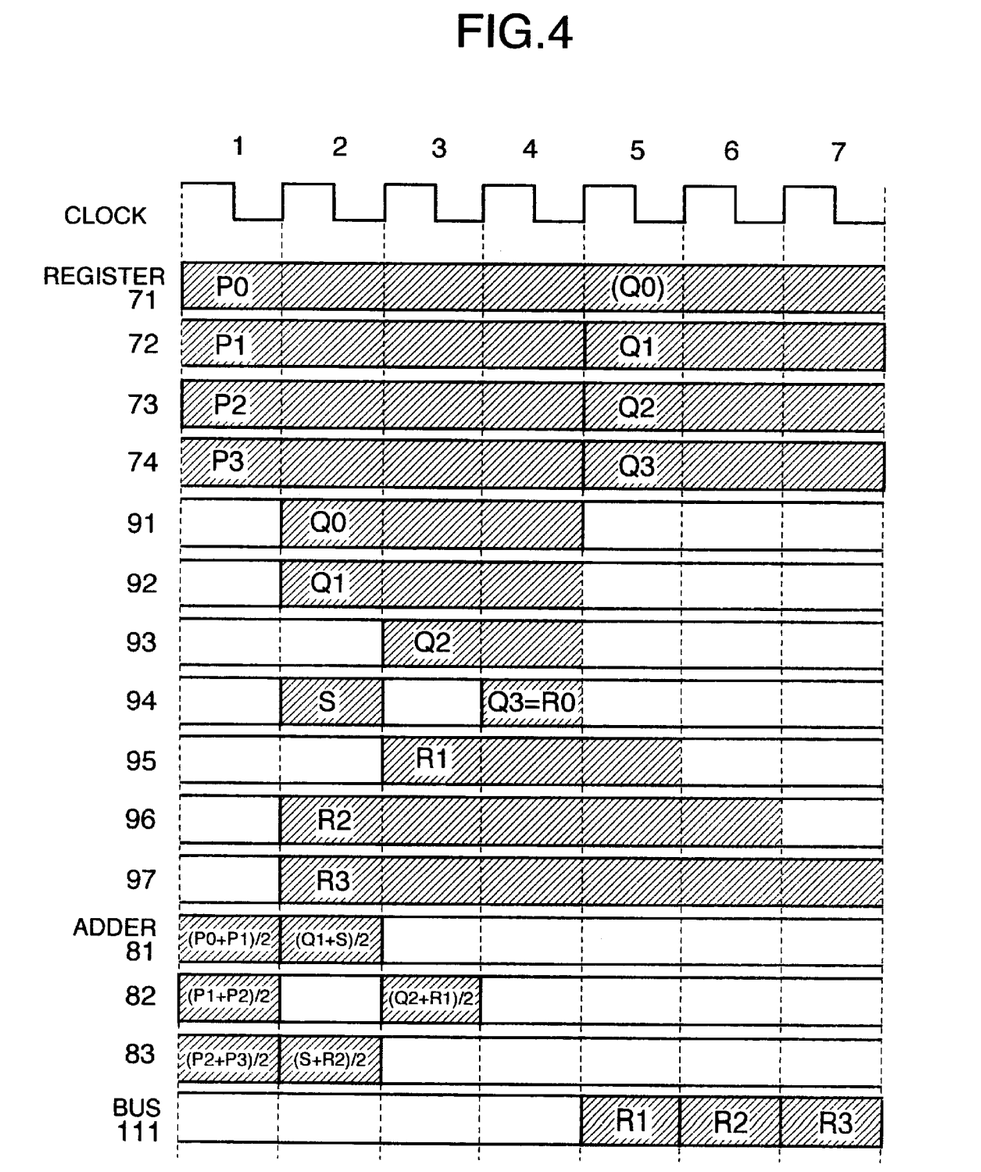
FIGS. 4 to 6 are charts showing the timing function of the various parts in FIG. 3.

FIG. 4 shows a case where ($Q_0 \ldots Q_3$) do not converge. Based on the result of discrimination by the convergence discrimination circuits 121, 122, the selector 131 is so switched that ($Q_1 \ldots Q_3$) are stored in the registers 72–74 at the start of the next cycle, and ($Q_1 \ldots Q_3$) are stored in the registers 72–74 at the start of a fifth cycle. The content of the register 71, being $Q_0$, remains unchanged. On the other hand, ($R_1 \ldots R_3$) are saved in succession in the stack memory 101 through the bus 111, in fifth, sixth and seventh cycles. The next ½ division cannot be started until the completion of the storage. Consequently 7 cycles are required in this case.

Figure 5:
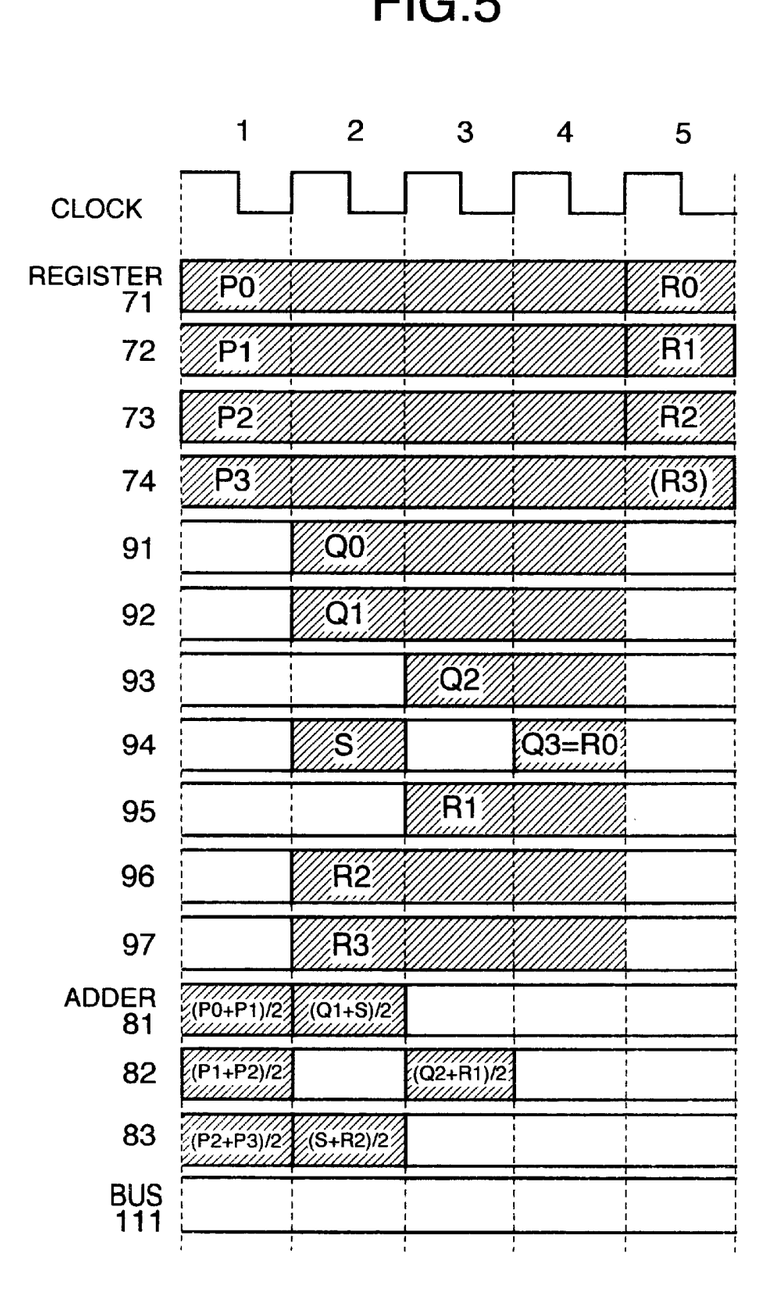

FIG. 5 shows a case where ($Q_0 \ldots Q_3$) converge but ($R_0 \ldots R_3$) do not converge. Based on the result of discrimination by the convergence discrimination circuits 121, 122 in the fourth cycle, $Q_0$ is released and the selector 131 is so switched that $(R_0 \ldots R_2)$ are stored in the registers 71–73. $(R_0 \ldots R_2)$ are stored in the registers 71–73 at the start of the fifth cycle. The content of the register 74, being $R_3$, remains unchanged. In this case 4 cycles are required, because the contents of the registers 71–74 are fixed at the start of the fifth cycle so that the aforementioned operations of the first cycle and thereafter can be started from the fifth cycle.

Figure 6:
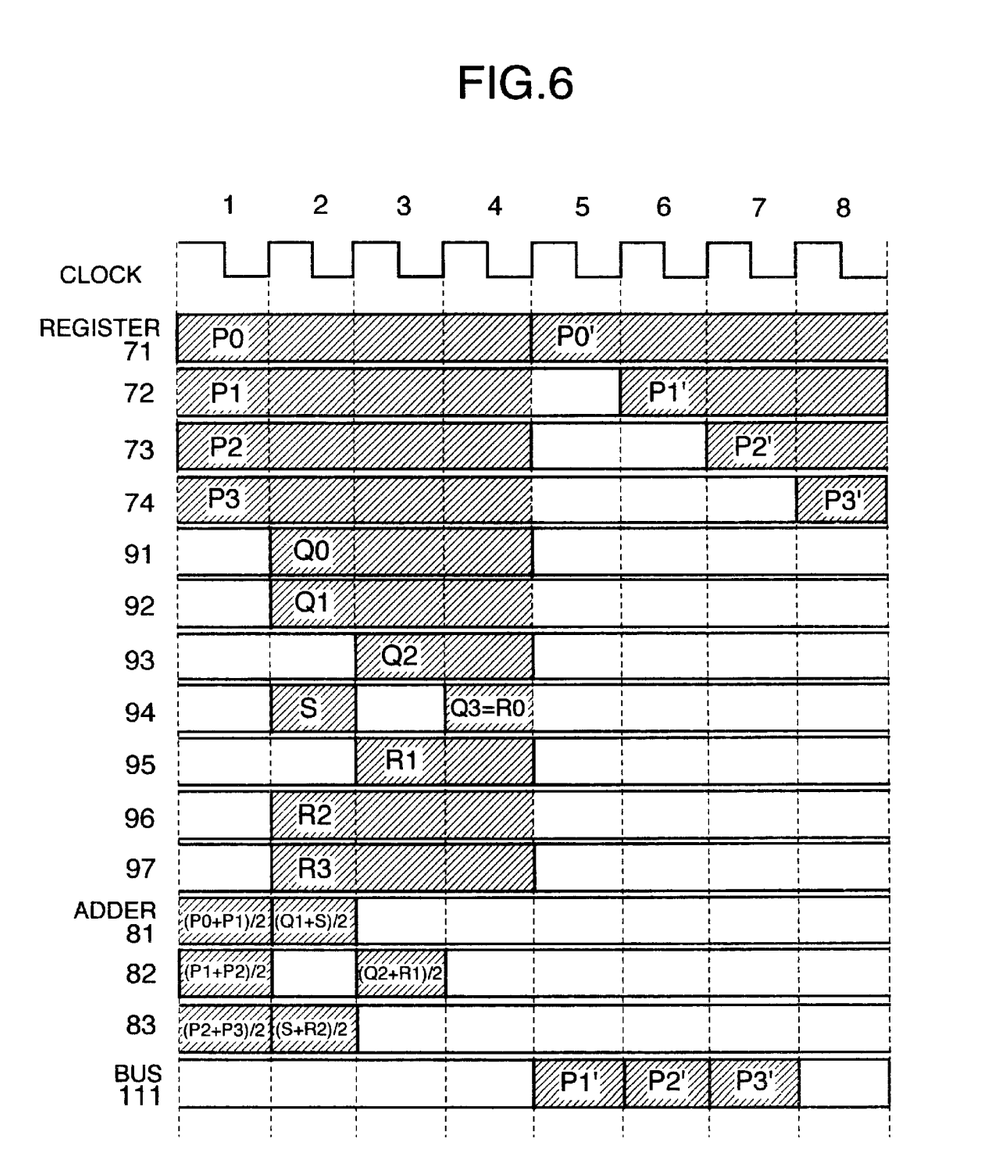

FIG. 6 shows a case where $(Q_0 \ldots Q_3)$ and $(R_0 \ldots R_3)$ both converge. Based on the result of discrimination by the convergence discrimination circuits 121, 122 in the fourth cycle, $Q_0$ and $R_3$ are released, and the selector 131 is so switched that the data of the control points can be revived in the fifth, sixth and seventh cycles and that the content of the register 97 can be transferred to the register 71. The data $(P_1', P_2', P_3')$ of three control is revived from the stack memory 101 to the registers 72–74 through the bus 111, in the fifth, sixth and seventh cycles. Also the content $(P_0')$ of the register 97 is stored in the register 71 through the selector 131, at the start of the fifth cycle. In this case, 7 cycles are required, as the contents of the registers 71–74 are fixed at the start of the eighth cycle.

In the configuration shown in FIG. 3, the width of the data port of the stack memory 101 and of the bus 111 is 32 bits, so that it is more suitable for LSI formation.

For operating this circuit, the clock cycle has to be set as follows, disregarding the data transfer time:

---

(a clock cycle) > max{(delay time of an adder), (delay time of convergence discrimination circuit + selector switching time), (stack memory access time)} + (register data set-up time)

---

If the stack memory is composed of a register file allowing high-speed access, the clock cycle in FIG. 3 can be made to be about ¼ of the clock cycle in FIG. 2. Consequently, in comparison with the circuit shown in FIG. 2, the circuit in FIG. 3 can process with a comparable speed in case $(Q_0 \ldots Q_3)$ converge but $(R_0 \ldots R_3)$ do not converge, but is slower by the time required for the cycles for transfer with the stack memory 101 in other cases.

[Another embodiment]

Figure 7:
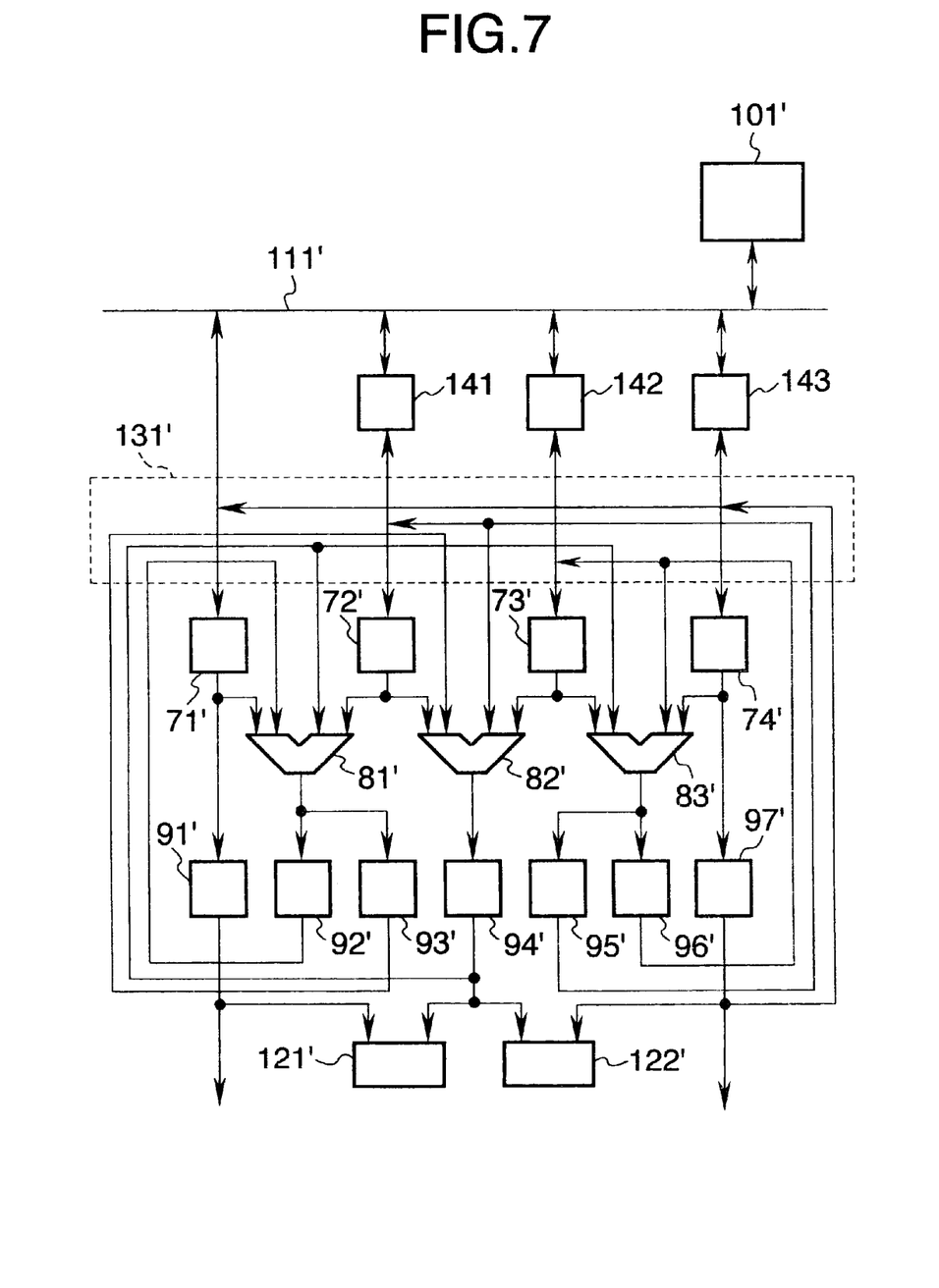
FIG. 7 is a block diagram showing another configuration according to the present invention.

FIG. 7 shows another embodiment of the present invention, wherein components equivalent in function and position to those in FIG. 3 are represented by primed corresponding numbers. Registers 141–143 alone are added to the configuration shown in FIG. 3, so that the increase in the magnitude of circuitry in this embodiment is minimal.

In the following, the function of the circuit shown in FIG. 7 will be explained with reference to timing charts in FIGS. 8, 9 and 10. This circuit is controlled by an unrepresented control circuit.

Figure 8:
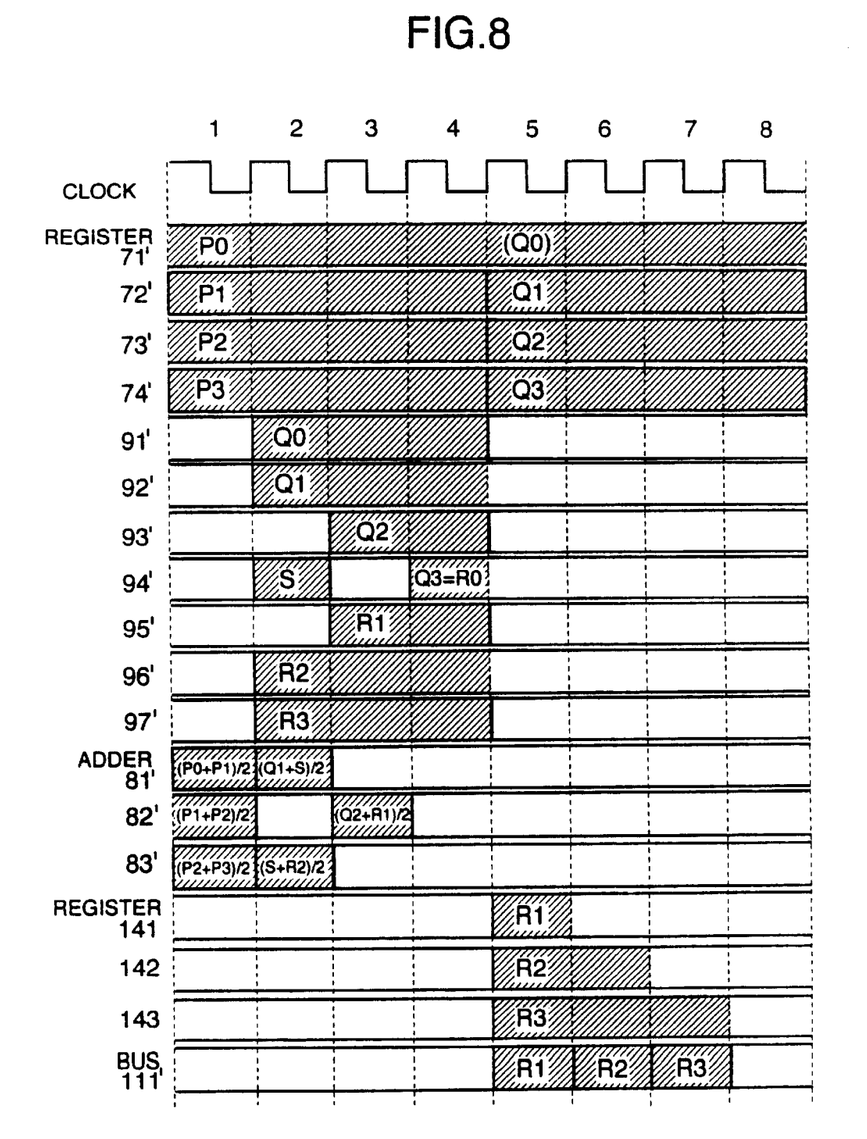
FIGS. 8 to 10 are charts showing the timing function of the various parts of the configuration according to the present invention.
Figure 9:
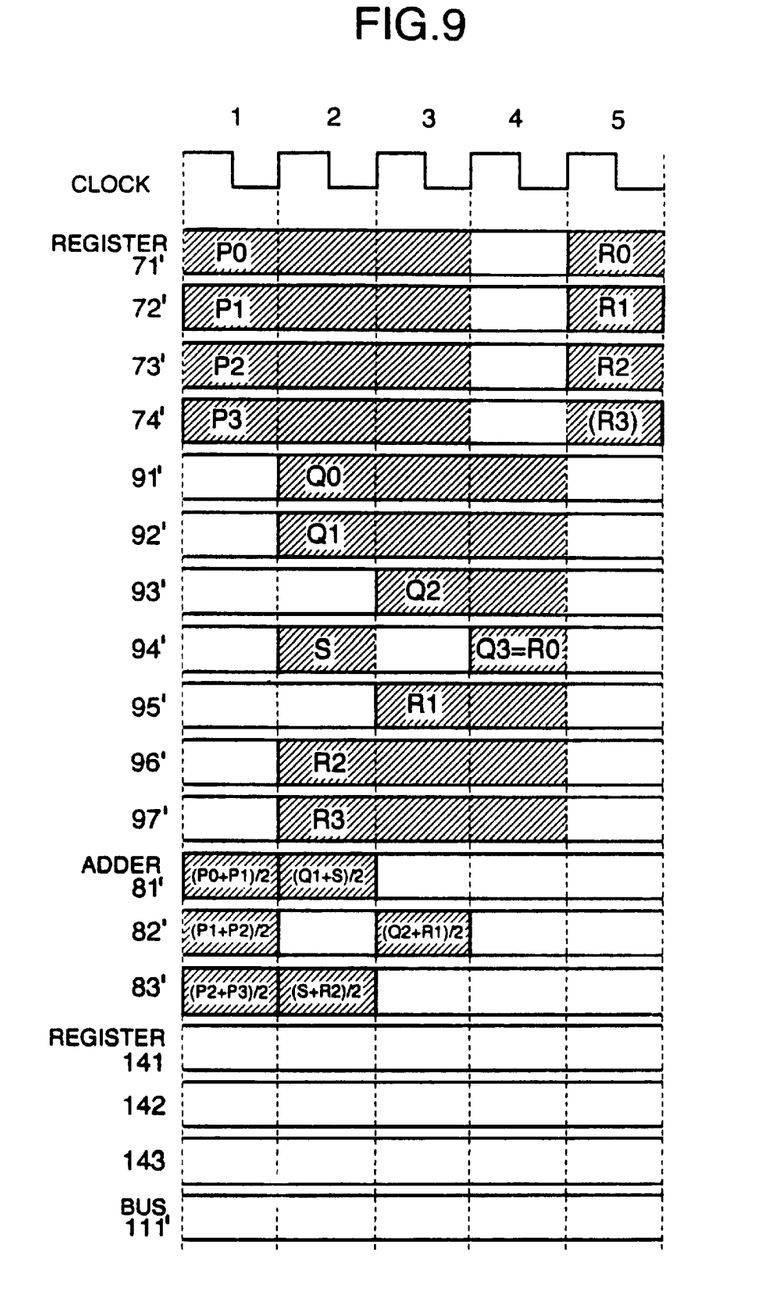
Figure 10:
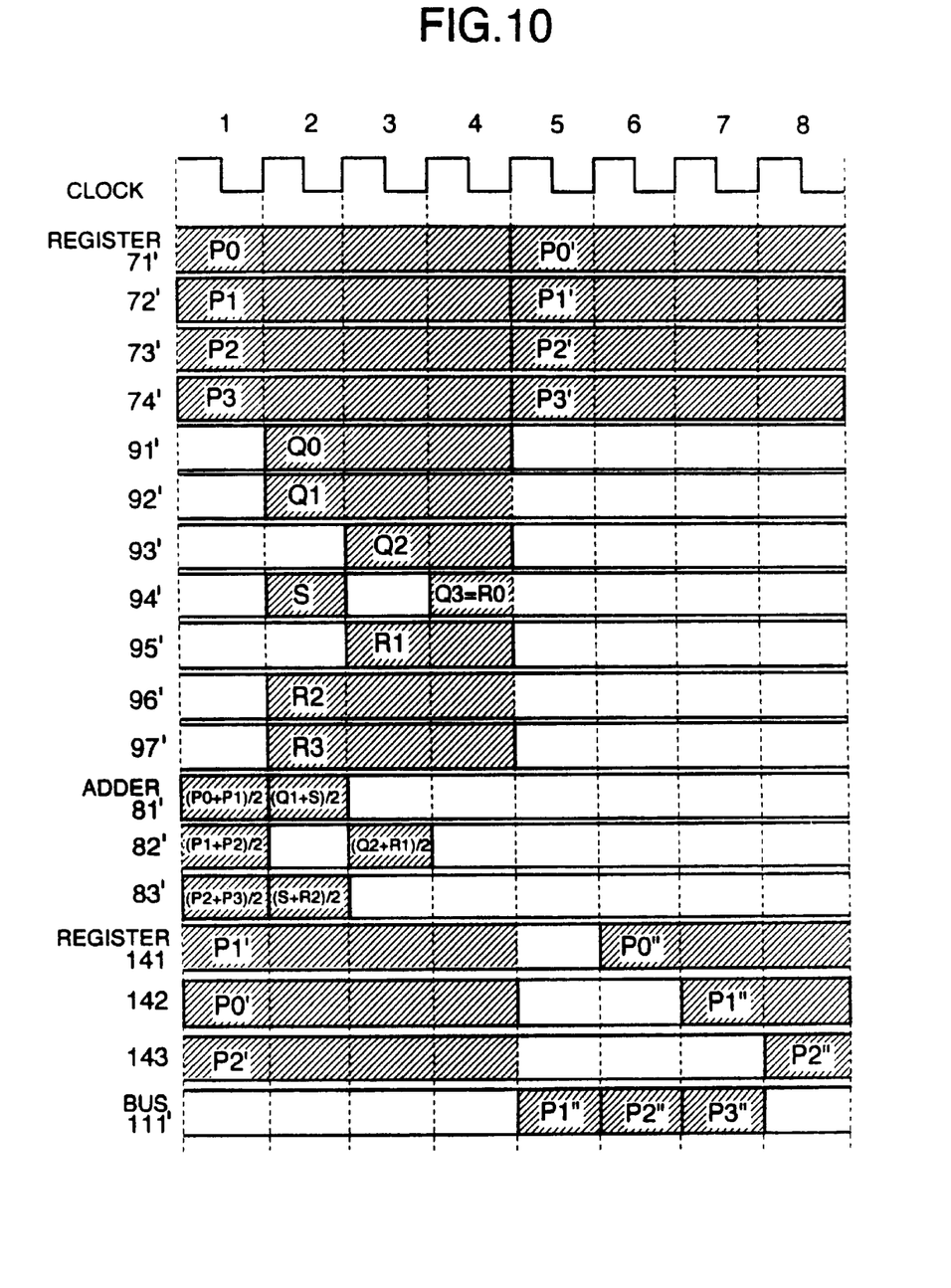

The operations to the fourth cycle are same in FIGS. 8, 9 and 10.

At first, in a first cycle, adders 81'–83' effect calculations $(P_0+P_1)/2$, $(P_1+P_2)/2$ and $(P_2+P_3)/2$, of which results $Q_1$, S, $R_2$ are respectively stored in the registers 92', 94', 96'. At the same time, $P_0$ is transferred as $Q_0$ to the register 91', and $P_3$ is transferred as $R_3$ to the register 97'.

In a second cycle, the adder 81' adds the contents $Q_1$, S of the registers 92', 94' and multiplies by ½, and the obtained result $Q_2$ is stored in the register 93'. Also the adder 83' adds the contents S, $R_2$ of the registers 94', 96' and multiplies by ½, and the obtained result $R_1$ is stored in the register 95'.

In a third cycle, the adder 82' adds the contents $Q_2$, $R_1$ of the registers 93', 95' and multiplies by ½, and the obtained result $Q_3=R_0$ is stored in the register 94'. At this point, $Q_0$ is stored in the register 91', $Q_1$ in 92', $Q_2$ in 93', $Q_3=R_0$ in 94', $R_1$ in 95', $R_2$ in 96', and $R_3$ in 97'. In this manner the ½ division as in FIG. 2 can be executed within three clock cycles.

In a fourth cycle, the convergence discrimination circuits 121', 122' discriminate whether $(Q_0 \ldots Q_3)$ and $(R_0 \ldots R_3)$ are in the converged state, and the process varies according to the result of the discrimination.

FIG. 8 shows a case where $(Q_0 \ldots Q_3)$ do not converge. Based on the result of discrimination by the convergence discrimination circuits 121', 122', the selector 131' is so switched that $(Q_1 \ldots Q_3)$ are stored in the registers 72'–74' at the start of the fifth cycle, and $(R_1 \ldots R_3)$ are stored in the registers 141–143 at the start of the fifth cycle. $(Q_1 \ldots Q_3)$ are stored in the registers 72'–74' in the fifth cycle. The content of the register 71, being $Q_0$, remains unchanged. Also $(R_1 \ldots R_3)$ are stored in the registers 141–143. Also in the fifth, sixth and seventh cycles, the contents of the registers 141–143 are saved in succession in the stack memory 101', but the contents of the registers 141–143 remain unchanged.

FIG. 9 shows a case where $(Q_0 \ldots Q_3)$ converge but $(R_0 \ldots R_3)$ do not converge. Based on the result of discrimination by the convergence discrimination circuits 121', 122', $Q_0$ is released and the selector 131' is so switched that $(R_0 \ldots R_2)$ are stored in the registers 71'–73'. $(R_0 \ldots R_2)$ are stored in the registers 71'–73' at the start of the fifth cycle. The content of the register 74', being $R_3$, remains unchanged.

FIG. 10 shows a case where $(Q_0 \ldots Q_3)$ and $(R_0 \ldots R_3)$ both converge. Based on the result of discrimination by the convergence discrimination circuits 121', 122', $Q_0$ and $R_0$ are released, and the selector 131' is so switched that the contents $(P_1', P_2', P_3')$ of the registers 141–143 are transferred to the registers 72'–74' and the content $(P_0')$ of the register 97' is transferred to the register 71' in the fifth cycle. Then, at the start of the fifth cycle, the contents of the registers 141–143 are transferred to the registers 72'–74'. It is to be noted that the contents of the registers 141–143 are same as those saved immediately before in the stack memory 101'. Also at the start of the fifth cycle, the content of the register 74' is stored in the register 71' through the selector 131'. Then, in the fifth, sixth and seventh cycles, the data $(P_1'', P_2'', P_3'')$ present in the second position from the top of the stack memory are revived in succession to the registers 141–143 from the stack memory 101', through the bus 111'. Also a preceding set of data is brought to the top of the stack memory. As a result, the content of the registers 141–143 always coincides with the data of a set at the top of the stack memory 101', after each ½ dividing operation. The content of the registers 141–143 may be used for reviving the data of the control points in the registers 72'–74' without waiting for a bus cycle, even when there continues the situation where $(Q_0 \ldots Q_3)$ and $(R_0 \ldots R_3)$ both converge.

In the following there will be considered the function of this circuit, particularly with respect to:

1) bus cycle between the stack memory 101' and the registers 141–143;
2) data transfer cycle between the registers 141–143 and the registers 72'–74', 95'–97'; and
3) ½ dividing operation.

The bus cycle occurs always in the fifth, sixth and seventh cycles.

The transfer cycle 2) always occurs at the start of the fifth cycle.

With respect to the ½ dividing operation 3), the data required for the next operation is fixed in the registers 71'–74' at the start of the fifth cycle. The ½ dividing operation can be executed in an independent and continuous manner, utilizing the data in the registers 71'–74'.

Consequently, in the function of this circuit, a pipeline operation is possible between the bus/transfer cycles and the ½ dividing operation. With such pipeline operation, each ½ dividing operation can be executed within 4 clock cycles.

In the determination of the number of necessary clock cycles, it is defined as 4 clock cycles, utilizing the above-mentioned pipeline operation.

Also a clock cycle can be selected comparable to that in the circuit shown in FIG. 3.

The foregoing description has been limited to the case of one-dimensional data, but the Bezier curve relating to the present invention is defined in a two-dimensional space and has x and y coordinates, and, for handling such Bezier curve, there should be prepared two sets of the parametric curve generating device explained above. In such case, the above-mentioned converged state is identified when x and y both converge, and the same discrimination is conducted for x and y coordinates.

The configurations shown in FIGS. 3 and 7 employ the registers 91, 97, 91', 97' for the purpose of simplicity, but these registers may be dispensed with. In such case the registers 91, 91', 97, 97' are replaced by the registers 71, 71', 74, 74' respectively.

The parametric curve generating device of the present embodiment is capable, by the entry of outline font data stored in a memory, of deriving control points for developing a curve, developing the curve based on thus derived control points and providing thus developed curve by an unrepresented printer or an unrepresented display device.

As explained in the foregoing, the parametric curve generating device of the present invention is capable of high-speed development of a Bezier curve with a limited magnitude of hardware. Also it is particularly suitable for LSI formation, because of the reduced bus width.

What is claimed is:

1. A curve generating apparatus connected to a bus and a stack memory connected to the bus, the stack memory storing coordinate values of control points of a curve, said apparatus comprising:

first register means for storing a coordinate value of a control point of a first curve;

dividing means for dividing the first curve into a plurality of curve sections;

second register means for storing coordinate values of control points of the plurality of curve sections divided by said dividing means;

third register means connected between said first register means and the bus, for storing a coordinate value of a control point of a second curve different from the first curve stored in said first register means;

discrimination means for discriminating based on the coordinate values of the control points of the plurality of divided curve sections stored in said second register means whether each of the plurality of divided curve sections is to be further divided; and control means for controlling said first register means to store the coordinate value of the control point of the second curve stored in said third register means when said discrimination means discriminates that each divided curve section is not to be further divided.

2. An apparatus according to claim 1, wherein said control means controls said first register means to store the coordinate value of the control point of one of the plurality of curve sections stored in said second register means and controls said third register means to store the coordinate value of the control point of another of the plurality of curve sections stored in said second register means for return to the stack memory when said discrimination means discriminates that each divided curve section is to be further divided.

3. An apparatus according to claim 1, wherein said control means comprises a selector circuit.

4. A control method for a curve generating apparatus connected to a bus and a stack memory connected to the bus, the stack memory storing coordinate values of control points of a curve, the curve generating apparatus having a first register for storing a coordinate value of a control point of a first curve, a divider circuit for dividing the first curve into a plurality of curve sections, a second register for storing coordinate values of control points of the plurality of divided curve sections, and a third register connected between the first register and the bus for storing a coordinate value of a control point of a second curve different from the first curve stored in the first register, said method comprising the steps of:

discriminating based on the coordinate values of the control points of the plurality of divided curve sections stored in the second register whether each of the plurality of divided curve sections is to be further divided; and controlling the first register to store the coordinate value of the control point of the second curve stored in the third register when it is discriminated in said discriminating step that each divided curve section is not to be further divided.

5. A method according to claim 4, wherein said controlling step includes controlling the first register to store the coordinate value of the control point of one of the plurality of curve sections stored in the second register and controls the third register to store the coordinate value of the control point of another of the plurality of curve sections stored in the second register for return to the stack memory it is discriminated in said discriminating step that each divided curve section is to be further divided.

6. A method according to claim 4, wherein said controlling step includes controlling the first register with a selector circuit.

* * * * *

UNITED STATES PATENT AND TRADEMARK OFFICE
CERTIFICATE OF CORRECTION

PATENT NO. : 5,900,884

DATED : May 4, 1999

INVENTOR(S): TOSHIAKI MINAMI, ET AL.

It is certified that error appears in the above-identified patent and that said Letters Patent is hereby corrected as shown below:

COLUMN 3

Line 5, "and" should be deleted.

COLUMN 4

Line 26, "and" should read --and 6.--.

COLUMN 5

Line 16, "control" should read --control points--.

COLUMN 8

Line 51, "it" should read --when it--.

Signed and Sealed this

Ninth Day of November, 1999

Attest:

Attesting Officer

Q. TODD DICKINSON

Acting Commissioner of Patents and Trademarks